Sept. 19, 1961 L. M. WARSHAWSKY ET AL 3,000,297
COMPUTER PLUGBOARD VERIFIER
Filed July 23, 1959 6 Sheets-Sheet 1

*INVENTORS*
LEON M. WARSHAWSKY
WOLFGANG G. BRAUN
BY
ATTORNEY
AGENT

INVENTORS
LEON M. WARSHAWSKY
WOLFGANG G. BRAUN

Sept. 19, 1961 L. M. WARSHAWSKY ET AL 3,000,297
COMPUTER PLUGBOARD VERIFIER
Filed July 23, 1959 6 Sheets—Sheet 5
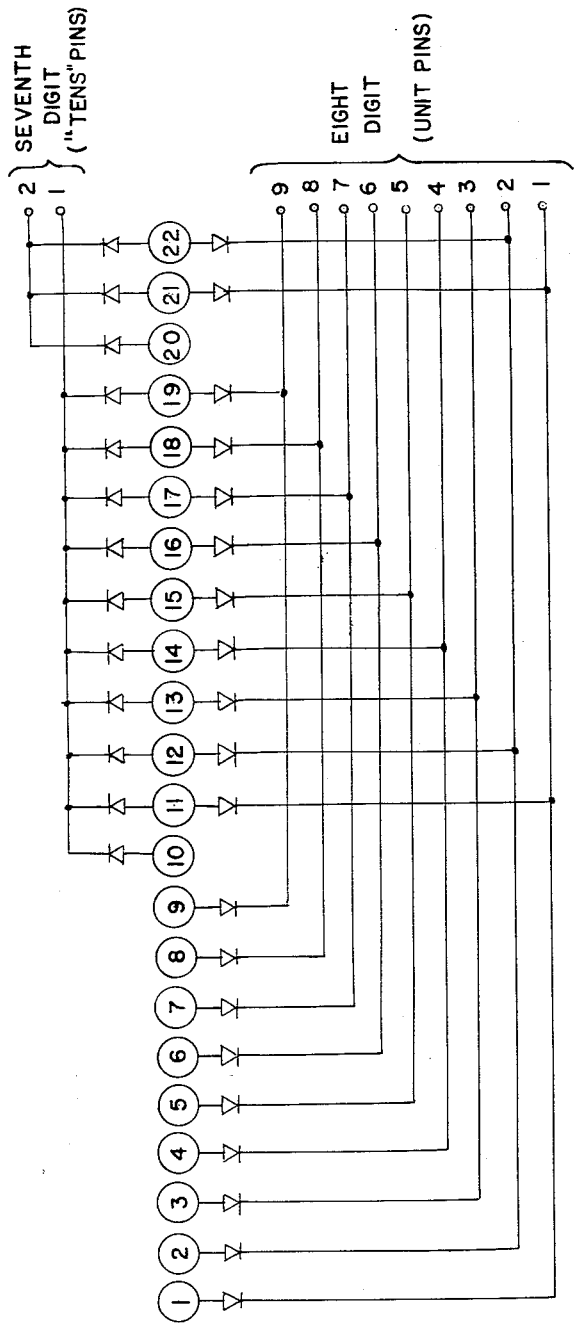
Fig-10
INVENTORS
LEON M. WARSHAWSKY
WOLFGANG G. BRAUN
BY
ATTORNEY
AGENT

United States Patent Office

3,000,297
Patented Sept. 19, 1961

3,000,297
COMPUTER PLUGBOARD VERIFIER
Leon Milton Warshawsky and Wolfgang G. Braun, Dayton, Ohio, assignors to the United States of America as represented by the Secretary of the Air Force
Filed July 23, 1959, Ser. No. 829,158
4 Claims. (Cl. 101—93)
(Granted under Title 35, U.S. Code (1952), sec. 266)

The invention described herein may be manufactured and used by or for the United States Government for governmental purposes without payment to us of any royalty thereon.

This invention relates to a device for checking a computer plugboard which checks and records all of the connections.

One object of this invention is to check a computer plugboard for errors in wiring.

Another object is to provide a record of the connections made for storage purposes.

A further object of the invention is to check for broken patchcord on a computer plugboard.

These and other objects will be more fully understood from the following detailed description taken with the drawing, wherein;

FIG. 8 shows the pin coder which is connected to the output pin bus lines of FIG. 6.

Figure 1:
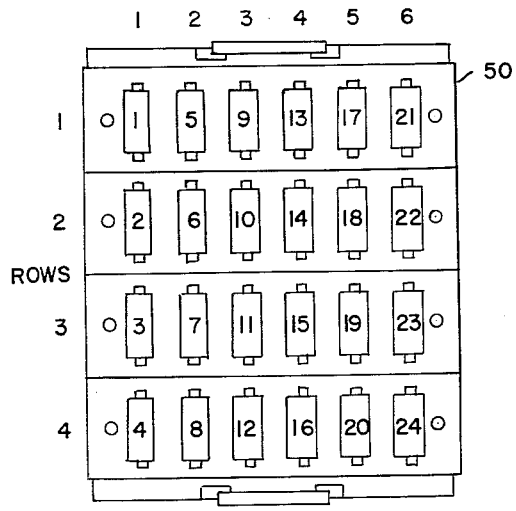
FIG. 1 shows a plugboard for one of the standard computers.

People engaged in the operation of large electronic computing facilities have learned, through hard and costly experience, that the greatest single source of errors is the human operator. Because of this, many efforts have been, and are being, made to relieve the operator of as many routine tasks as is possible in setting up and running his machine. Another approach to the problem of human errors involves, not the elimination of human operations, but rather the detection of any such errors. This is the principle of the device of this invention.

The class of computers to which this device applies directly is that in which the operational elements are interconnected on a plugboard by means of electrical conductors called patchcords. Furthermore, it is assumed that the plugboard is detachable from the computer so that it may be wired and checked away from the machine. Quite a few analog computers of the differential analyzer type fall in this class, such as those built by Reeves Instrument Corporation, Goodyear Aircraft, Electronic Associates, etc. In addition, some digital computers use plugboards and patchcords.

Besides offering a means of catching errors made by the operators in patching in problems on these computers, the device has another capability, viz. problem storage. It quite often happens in the operation of a computing facility, that it becomes necessary to restore to the machine, a problem that had been run some time previously. Several good legitimate reasons might exist for this in addition to the dreaded one that a mistake had been discovered in the original work. An important consideration here is that the rerun set-up be identical with the original one rather than merely being functionally the same, since the best chance of obtaining reproducibility of results exists when the identical element and components are involved in two sets of runs made.

The surest way to accomplish this would be to store the wired-up plugboards. Unfortunately, if the number of problems is large and the time between reruns long, this soon becomes an economic burden, as plugboards are quite expensive. The alternative to this is to rewire the plugboards when needed. Fortunately, this does not cost machine time to any great extent as the plugboard wiring is done away from the machine. The plugboard verifier provides the means of checking the rewiring job to determine that it precisely agrees with that used earlier. Thus the "problem storage" capability of the device exists in the printed list of connections it produces.

A third, fortunately not often required, capability of the device, is that of pointing out the existence of non-conducting patchcords, caused by broken wires, high contact resistance, and cold soldered joints. The location of these faults, by tracking down their effects on the solution, can often take days. If the effect of the missing lead is not sufficient to change the basic nature of the solution, the operator often does not even know that an error exists.

The basic idea of the plugboard verifier is very simple. It automatically, and rather rapidly, scans the wired-up plugboard and prints a list of pairs of numbers, side by side, indicating those pairs of holes which are connected by patchcords. Since each hole has a uniquely defined function in terms of the operational elements of the computer, these hole numbers then specify the functional hook-up of the machine. It makes use of the conductance of the patchcords in doing this.

To prove the feasibility of the idea, a prototype verifier was designed and fabricated for use in checking plugboards for the Reeves Electronic Analog Computer, which will hereafter be referred to as REAC. It should be pointed out that, though this particular board, having only five hundred twenty eight holes, is not sufficiently large to warrant the use of a plugboard verifier it was useful in proving the feasibility of such a device. With boards having fifteen hundred to three thousand holes it is believed that this device will be very useful.

Figure 2:
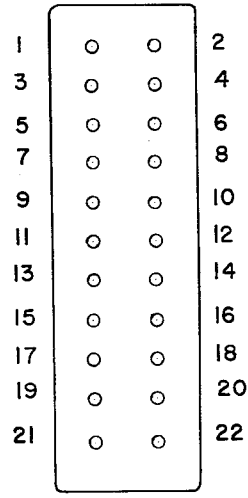
FIG. 2 shows the pin locations for one of the plugs of the plugboard of FIG. 1.

Referring more particularly to FIG. 1 of the drawing, a plugboard 50 for an REAC computer has 24 plugs located thereon. These plugs are located in 4 rows and 6 columns. Each plug has 22 pins as shown in FIG. 2. As can be seen, a four digit code can be used to represent any single pin on the plugboard.

Figure 3:
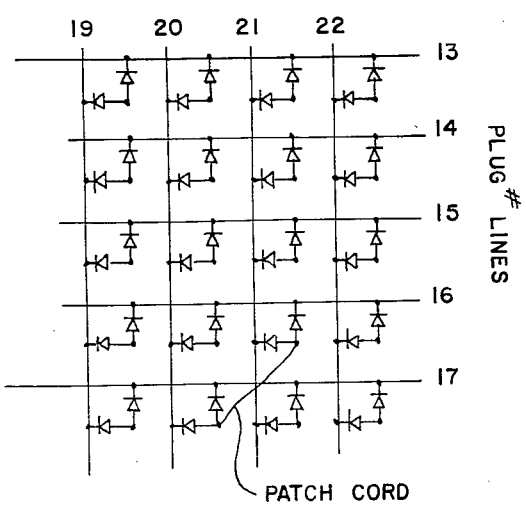
FIG. 3 shows a portion of the rectifier matrix pins of the plugboard.

The first digit can be used to indicate the row on the plugboard and the second can be used to indicate the column. The third and fourth digits are then used to indicate the pin number. The first digit will then be 1, 2, 3 or 4, the second 1, 2, 3, 4, 5 or 6, the third 0, 1 or 2 and the fourth any number between 0 and 9. Every connection by means of a patchcord will then be listed as two, four digit numbers. The order for scanning the plugs is shown by the numbers on the plugs in FIG. 1. The order for scanning the pins is from 1 to 22. The scanning proceeds from one pin to the next and when a patchcord is encountered the test voltage will appear on both the pin being scanned and the pin at the other end of the patchcord. The identification of the pin at the other end of the patchcord is obtained by means of a pair of rectifiers as shown in FIG. 3. As shown in FIG. 3, all of the pins, with the same number are connected through rectifiers to the same pin bus line and all of the pins on the same plug are connected through rectifiers to the same plug bus line. The plug bus lines are connected to the corresponding numbered terminal in the rectifier circuit of FIG. 7 through a switch as will be explained in connection with FIG. 4 and the pin bus lines are connected directly to the corresponding numbered terminal in the rectifier circuit of FIG. 8. The output of the rectifier matrix operates column 5, 6, 7 and 8 of the printer to produce the second code number. Symbols such as letters may be substituted for the numbers on the printer.

As can be seen from FIG. 3, a pin must be disconnected from the rectifier matrix after it has been scanned or there will be two sets of code numbers printed for each patchcord. Also, the pin must be disconnected from the matrix while it is being scanned or there will be an output to the printer from two sets of bus lines, which would operate two printer keys in each of the last four columns of the printer. There are therefore three states for each pin, before scanning, connected to rectifier matrix only, during scanning, disconnected from matrix and connected to test voltage; after scanning disconnected from both test voltage and rectifier matrix.

Figure 4:
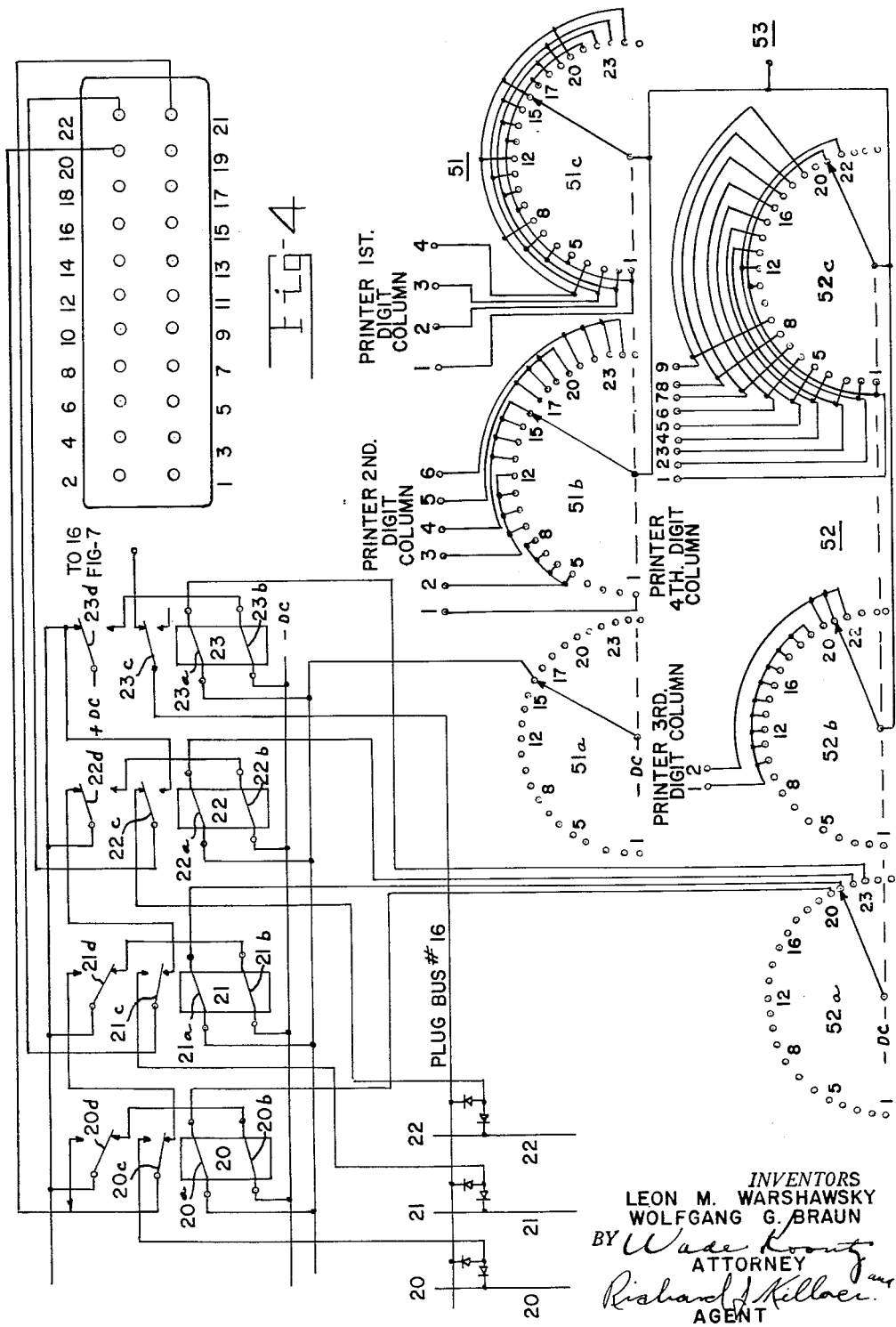
FIG. 4 shows a portion of a relay matrix of this invention for use with one plug of the plugboard of FIG. 1.

The circuit of FIG. 4 is used to set up the three states of circuit connections and to operate the first four columns of the printer which identifies the pin being scanned. The relay connections for all of the pins on a plug are the same and the relay connections for all of the plugs are the same therefore the operating relays for only a portion of one plug is shown.

There are twenty three relays per plug, 22 pin relays and one drop out relay. Each relay has a pull in winding and a hold winding.

Plug stepping switch 51 has three banks of contacts. Bank 51a acts to apply a positive D.C. voltage to all of the pull in windings associated with one plug. Pin stepping switch 52 also has three banks of contacts. The determination of which relay on the plug is pulled in is made by bank 52a which completes the circuit through the pull in windings to the negative terminal of the D.C. supply. Relay 21 is shown as pulled in. Relay 20 which was previously scanned is held in by current flowing through hold winding 20b, from contact 20d and 23d. Pin 20 is now disconnected from both the rectifier matrix and the +D.C. supply since contacts 20c and 21d are both in the lower position.

Pin 21 is disconnected from the rectifier matrix since switch 21c is in its lower position. In this lower position, pin 21 is connected to the +D.C. voltage through switches 22d and 23d. If a patchcord is present this voltage will appear in the rectifier matrix at the pin at the other end of the patchcord which would be pin 20, on plug 17, with the connection shown in FIG. 3. Pin 22, which has not yet been reached by the scanner, is connected only to the matrix through the upper contact of switch 22c. The hold coil of relay 21 is connected to the +D.C. voltage by contact 21d when the relay is pulled in.

After each pin is scanned its relay hold coil remains connected to the +D.C. supply and continues to draw current. Relay 23 is provided to disconnect all of the relays from the +D.C. supply by opening contact 23d, since an excessive amount of current would be flowing if all of the hold windings for the whole plugboard were to draw current at the same time. This will again connect all of the pins to the rectifier circuit. A second contact 23c makes the rectifiers for this plug ineffective by opening the plug line to the printer. The reason that this will make the rectifier connections ineffective will be explained later.

Banks 51b, 51c, 52b and 52c of switches 51 and 52 act to operate solenoids on the printer if a patchcord is present. Bank 51c operates the solenoids over the first column of the printer keyboard of FIG. 5, 51b operates the solenoids in column 2, 52b operates the solenoids in column 3 and 52c operates the solenoids in column 4. If a patchcord is encountered an A.C. pulse is applied to these four switches and to the corresponding solenoids from terminal 53, as will be explained later. If desired, a fourth bank of switches may be provided on rotary switches 51 and 52 to operate indicating lights to show the progress of the scanning.

Figure 5:
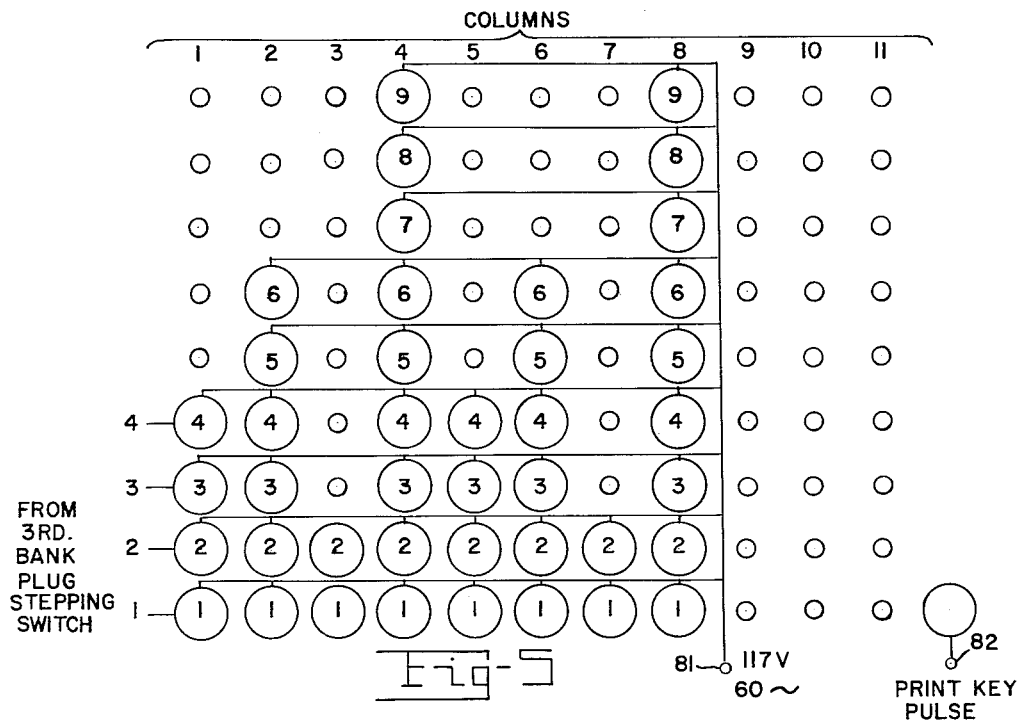
FIG. 5 shows a keyboard schematic of a standard printer with solenoids located over certain of the keys of the printer.

Switches 51 and 52 are solenoid operated and have a pawl and gear linkage, not shown, to impart rotary motion. The circuit of FIG. 5 is the switch stepping circuit. Assuming no hold signal is present the pin stepping switch coil on solenoid 60 is energized through the upper contact of 61a and the lower contact of 65a, which causes its armature to pull in. This does not advance the switch since the switch advances when the solenoid voltage is removed. When the armature is pulled in, relay 62 is energized through contact 60a. This now energizes relay 61 through the lower contact of 62a, deenergizing the stepping solenoid coil and permitting the pin stepping switch to advance one step. The voltage is then removed from relay 62, which opens with a time delay as determined by $R_1$ and $C_1$. When 62 opens, 61 also opens, thus completing the cycle. The cycle repeats itself until a patchcord is reached at which time a hold voltage is fed to relay 61. This signal arrives almost immediately after the stepping switch advances, thus during the delay time of the circuit $R_1C_1$, and holds relay 61 open. With switch 61a in its lower position no voltage is applied to the pin stepping solenoid so the switch remains in that position until an advance one step pulse is received. This signal energizes solenoid 60 to advance the pin stepping switch 52 one step. The advance of stepping switch 52 removes the hold signal from relay 61, as will be explained later, and the automatic stepping again continues until another patchcord is reached.

In the 26th position of the pin stepping switch, cam 66 closes contacts 66a, which completes the circuit through contact 64a to plug stepping solenoid 63. This closes contacts 63a and energizes relay 64 which opens the circuit to solenoid 63 and allows the plug stepping switch to advance one step. Contact 64b is a holding switch which keeps relay 64 energized until switch 66a opens. When scanning is complete plug switch cam 67 opens the circuit through relay 65, which in turn opens the circuit through 61a, thus stopping the scanning operation. This cam also lights a light 68 to indicate that the scanning is complete. To start the scanning again starting switch 61 is depressed and held while the pin stepping switch runs through one cycle. This causes the plug stepping switch to advance one step and allows cam 67 to move off of switch 67a. Scanning then proceeds automatically.

As has been explained with reference to FIG. 3, the output of plug lines are connected to the corresponding numbered terminal in FIG. 7. With the connection shown in FIG. 3 and with the stepping switches in the position shown in FIG. 4 the test voltage will appear on plug bus line 17 and pin bus line 20. Since plug 17 has not been scanned, this voltage will be applied through relay switch 23c of plug 17 to terminal 17 in FIG. 7. This voltage will be applied to line 1 of the fifth digit column and line 5 of the sixth digit column to the corresponding relay terminals in FIG. 9. The voltage from pin line 20 will be applied to terminal 20 of FIG. 8. This voltage will then appear on line 2 of the seventh digit column and to the corresponding relay in FIG. 9. No voltage will appear for the eighth digit column.

Figure 6:
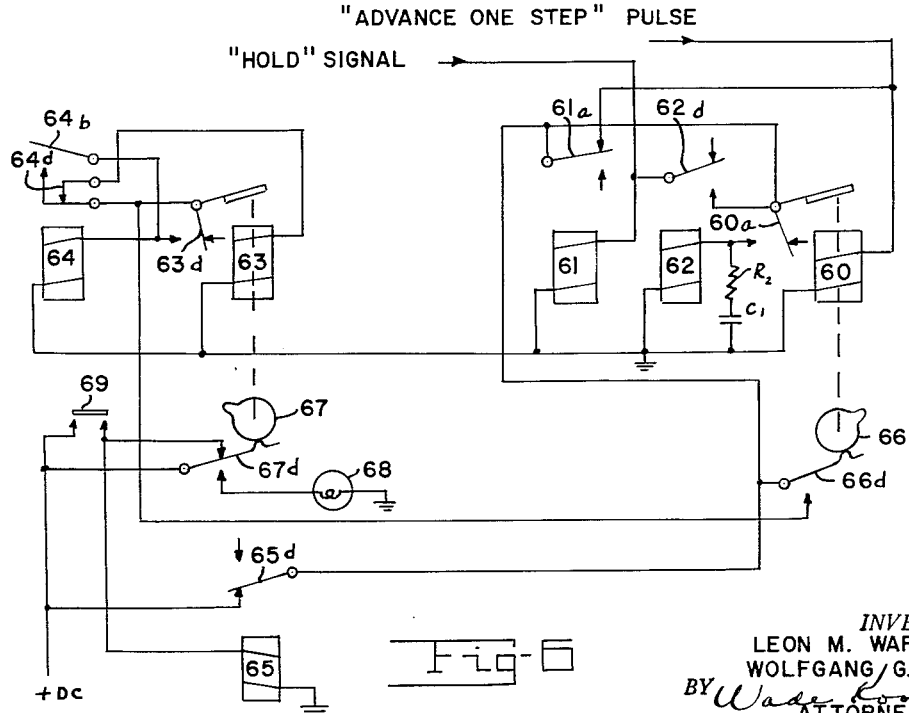
FIG. 6 shows the drive circuit for the stepping switches of FIG. 3.
Figure 7:
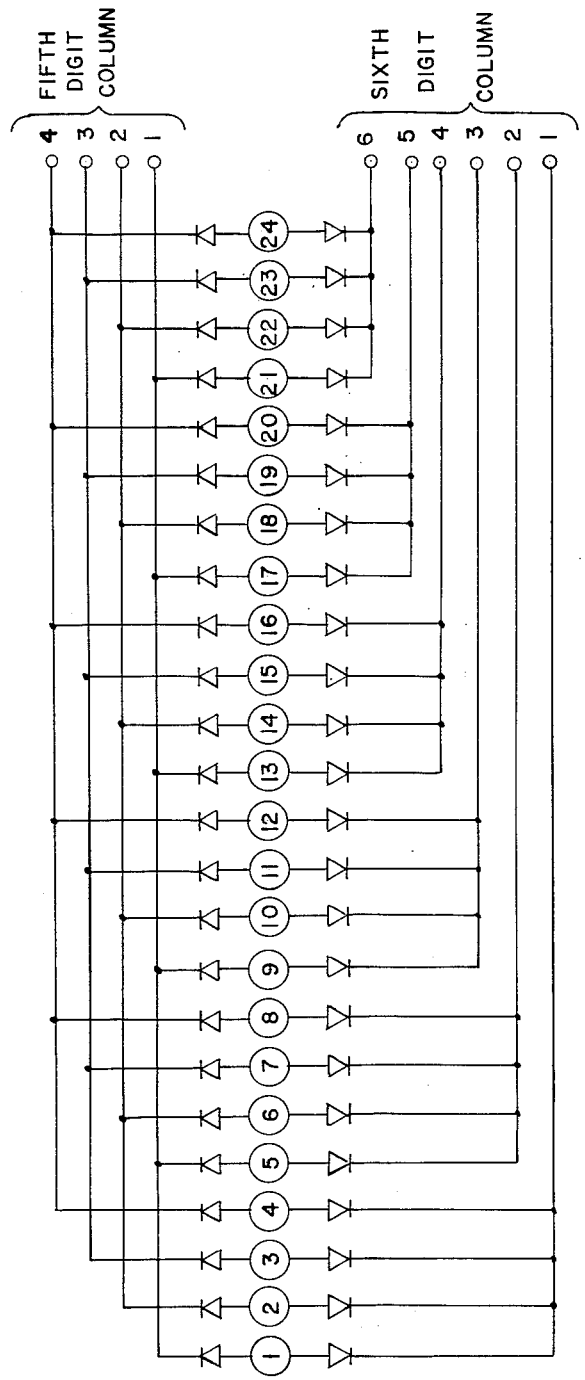
FIG. 7 shows the plug coder which is connected to the output plug bus lines of FIG. 6.
Figure 9:
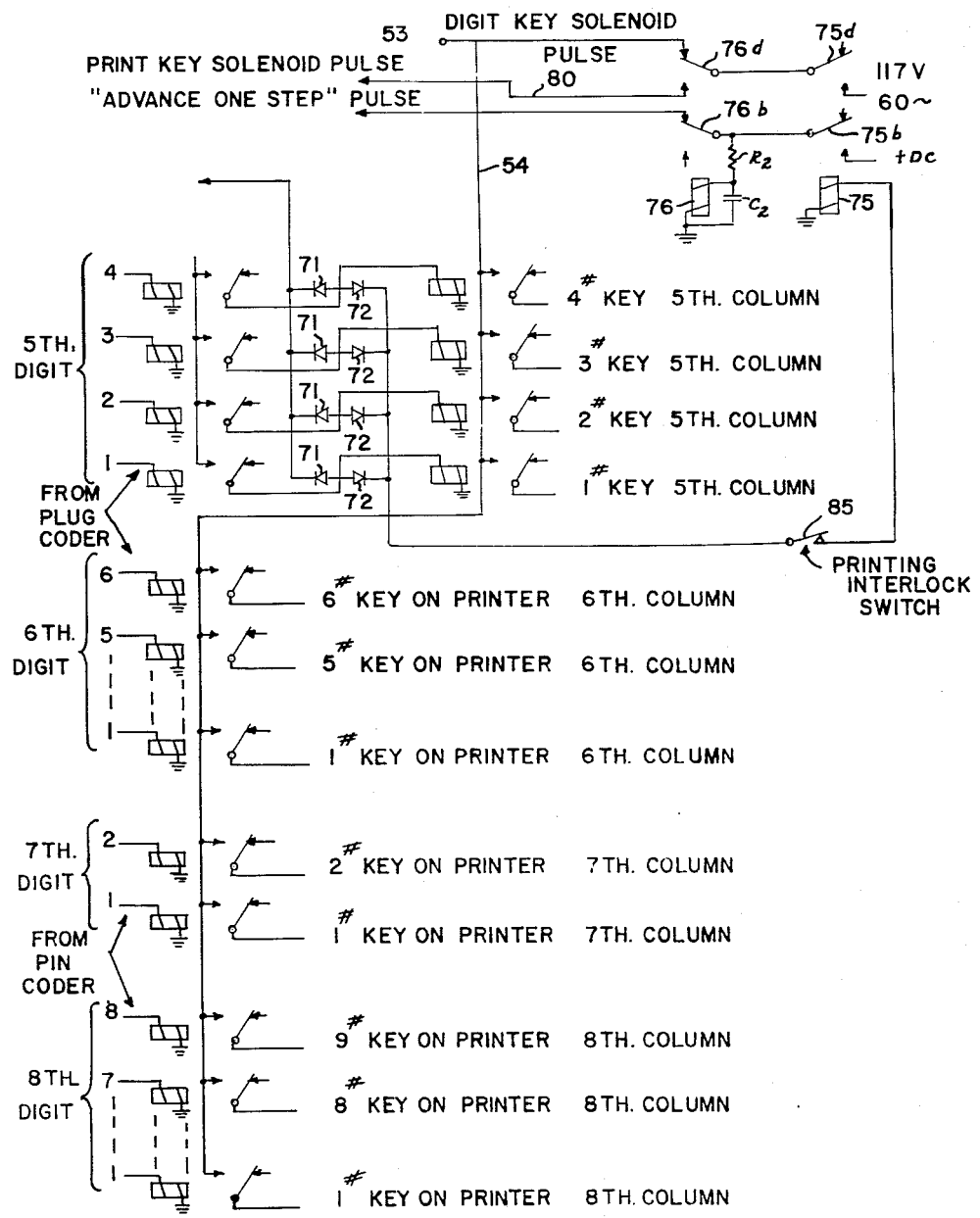
FIG. 9 shows the patchcord sensing and printing circuit for the device of the invention.

As can be seen from FIG. 7 and FIG. 9, when a patchcord is reached, one of the four relays of FIG. 9 associated with the fifth digit will always be energized. Advantage is taken of this fact to generate the hold signal. Therefore the closure of any of the relays for the fifth digit will generate a hold signal through one of the rectifiers 71. Another signal, called the read out and print signal, is obtained from one of the other set of rectifiers 72. This signal energizes relay 75 which connects contact 75a to the 117 volt 60 cycle voltage and applies this voltage to lines 53 in FIG. 4 and 54 in FIG. 9 to energize the printer solenoids to depress the printer keys corresponding to the pins at both ends of the patchcord. The other terminal for the 117 volt 60 cycle voltage is shown at 81 in FIG. 5. Also an advance one step pulse is applied to relay 60 of FIG. 6 through switch 75b. When switch 75b is closed, relay 76 is also energized after a delay as determined by $R_2$ and $C_2$, which is about twenty-five milliseconds. This opens contacts 76a and 76b, thus stopping the digit key solenoid pulse and the advance one step pulse, and starts a print key solenoid pulse on line 80 that is applied to terminal 82 in FIG. 5, which causes the printing to take place. If any column on the printer has no key depressed such as, for example, the 8th digit column as described previously, the printer automatically prints a zero.

A printing interlock switch 85, which is found on most printers, is opened when the printing operation starts and closes when it is complete. This will keep relay 75 from being operated if a new patchcord is reached by the stepping switch before the printing operation is complete.

Since the fifth digit is operated off of the plug bus line, and since this digit controls the hold and print operation, it is necessary to disengage only the plug bus from the rectifier matrix through switches 23c to make the rectifier connections ineffective after the plug has been scanned.

It is obvious the other codes, as well as other orders of scanning than those described, could be used if desired.

There is thus provided a device for checking a computer plugboard, which checks and records all of the connections.

Though one specific embodiment has been described in detail, it is obvious that numerous changes might be made without departing from the general principles and scope of the invention.

What we claim is:

1. A device for checking the circuit connections on a computer plugboard having a plurality of plugs with a plurality of connector pins on each plug and with certain of said pins being connected together with patchcords, comprising; a rectifier matrix, said rectifier matrix having a first pair of rectifiers connected to each pin, a plug bus line for each plug on said plugboard, one of said rectifiers for all of the pins on each plug being connected to the corresponding plug bus line, a pin bus line for each pin on said plug, the other of said rectifiers for all of the like positioned pins on each plug being connected to the corresponding pin bus line, a printer having key operating solenoids over certain of its keys, means for sequentially applying a test voltage to said pin and the pin of the other end of the patchcord if a patchcord is encountered, means connected to said last named means for operating certain solenoids of said printer over code symbols representing the pin being tested, a second pair of rectifiers connected to the output of each of said plug bus lines, means responsive to an output from a pair of rectifiers connected to one of said plug bus lines for operating solenoids on said printer over code symbols representing the plug on which the pin at said other end of a patchcord appears, a third pair of rectifiers connected to the output of each of said pin bus lines, means responsive to an output from a pair of rectifiers connected to one of said pin bus lines for operating solenoids on said printer over code symbols representing the pin at said other end of an encountered patchcord, means responsive to an output from a pair of rectifiers connected to a plug bus line for stopping the scanning and for operating said printer to record the code numbers representing the pins at both ends of an encountered patchcord, means for starting the scanning after the printing information has been supplied to the printer and means for disconnecting each of said pins from the checking circuit after it has been checked.

2. A device for checking the circuit connections on a computer plugboard having a plurality of plugs located in a plurality of rows and columns with the same number of pins on each plug and with certain of said pins being connected together with patchcords, comprising; a rectifier matrix, said rectifier matrix having a first pair of rectifiers connected to each pin, a plug bus line for each plug on said plugboard, one of said rectifiers for all of the pins on each plug being connected to the corresponding plug bus line a pin bus line for each pin on said plug, the other of said rectifiers for all of the like positioned pins on each plug being connected to the corresponding pin bus line, a printer having at least eight columns and having key operating solenoids over certain of its keys, means for sequentially applying a test voltage to said pins and the pin at the other end of an encountered patchcord means connected to said means for applying test voltages to said pins for operating certain solenoids on said printer over numbers representing the row and column of the plug on which the pin being tested appears and other solenoids over code numbers representing said pin, a second pair of rectifiers connected to the output of each of said plug bus lines a first group of relays with one relay corresponding to each row on said computer plugboard, means for connecting each of said plug bus lines through a corresponding one of said second pair of rectifiers to the relay corresponding to the row in which the plug appears, a second group of relays with one relay corresponding to each column on said computer plugboard, means for connecting each of said plug bus lines through a corresponding one of the other of said second pair of rectifiers to the relay corresponding to the column in which the plug appears, a third pair of rectifiers connected to the output of each of said pin bus lines, a third group of relays corresponding to the tens digits appearing in the pin numbers on each plug with no relay being provided for the zero digit, means for connecting each of said pin bus lines with a tens digit other than zero to the corresponding relay of said third group of relays through a corresponding one of said third pair of rectifiers, a fourth group of relays corresponding to the units digits appearing in the pin number of each plug with no relay being provided for the zero digit, means for connecting each of said pin bus lines with a units digit other than zero to the corresponding relay of said fourth group of relays through a corresponding other one of said third pair of rectifiers, means responsive to said first group of relays for operating the solenoid on said printer over code numbers representing the row of the plug on which the pin at the other end of the patchcord appears, means responsive to said second group of relays for operating the solenoid on said printer over code numbers representing the column of the plug on which the pin at the other end of the patchcord appears, means responsive to said third and fourth group of relays for operating the solenoids on said printer over code numbers representing the pin at the other end of the patchcord, means responsive to an output from one of said first group of relays for stopping the scanning and for operating said printer to record the code numbers representing the pins at both ends of an encountered patchcord, means for starting the scanning after the printing information has been supplied to the printer and means for disconnecting each of said pins from the checking circuit after it has been checked.

3. A device for checking the circuit connections on a computer plugboard having a plurality of plugs located in a plurality of rows and columns with the same number of pins on each plug and with certain of said pins being connected together with patchcords, comprising; a rectifier matrix, said rectifier matrix having a first pair of rectifiers connected to each pin, a plug bus line for each plug on said plugboard, one of said rectifiers for all of the pins on each plug being connected to the corresponding plug bus line a pin bus line for each pin on said plug, the other of said rectifiers for all of the like positioned pins on each plug being connected to the corresponding pin bus line, a printer having at least eight columns and having key operating solenoids over certain of its keys, a double throw, double pole relay having a pull in winding and a hold winding associated with each pin on said plugboard, a plug stepping switch for sequentially connecting one terminal of the pull in winding of all of the relays associated with one plug on the plugboard to the positive terminal of a D.C. supply voltage, means connected to said plug stepping switch for operating a solenoid on said printer over the number representing the row in which the plug appears on the plugboard when a patchcord is encountered, a second means connected to said plug stepping switch for operating a solenoid on said printer over the number representing the column in which the plug appears on the plugboard, a pin stepping switch for sequentially connecting the other terminal of each of said pull in windings of the relays associated with the pins on one plugboard to the negative terminal of the D.C. supply to thereby sequentially disconnect the corresponding pin from the rectifier matrix and connect it to a source of D.C. voltage and simultaneously energize the hold winding of the corresponding relay, means connected to said pin stepping switch for operating solenoids over numbers on said printer representing the pin number on said plug when a patchcord is encountered, means for automatically stepping said pin stepping switch from one pin to the next, means for stepping the plug stepping switch one step for each complete revolution of said pin stepping switch, a second pair of rectifiers connected to the output of each of said plug bus lines a first group of relays with one relay corresponding to each row on said computer plugboard, means for connecting each of said plug bus lines through a corresponding one of said second pair of rectifiers to the relay corresponding to the row in which the plug appears, a second group of relays with one relay corresponding to each column on said computer plugboard, means for connecting each of said plug bus lines through a corresponding one of the other of said second pair of rectifiers to the relay corresponding to the column in which the plug appears, a third pair of rectifiers connected to the output of each of said pin bus lines, a third group of relays corresponding to the tens digits appearing in the pin numbers on each plug, with no relay being provided for the zero digit, means for connecting each of said pin bus lines with a tens digit, other than zero, to the corresponding relay of said third group of relays through a corresponding one of said third pair of rectifiers, a fourth group of relays corresponding to the units digits appearing in the pin number of each plug with no relay being provided for the zero digit, means for connecting each of said pin bus lines with a units digit other than zero to the corresponding relay of said fourth group of relays through a corresponding other one of said third pair of rectifiers, means responsive to said first group of relays for operating the solenoid on said printer over code numbers representing the row of the plug on which the pin at the other end of the patchcord appears, means responsive to said second group of relays for operating the solenoid on said printer over code numbers representing the column of the plug on which the pin at the other end of the patchcord appears, means responsive to said third and said fourth group of relays for operating the solenoid on said printer over code number representing the pin at the other end of the patchcord, means responsive to an output from one of said first group of relays for stopping the scanning and for operating said printer to record the code numbers representing the pins at both ends of an encountered patchcord, means for starting the scanning after the printing information has been supplied to the printer and means for disengaging all of the hold windings for the relays on one plug and for disconnecting the corresponding plug bus line from the corresponding second pair of rectifiers after the plug is completely scanned.

4. A device for checking the circuit connections on a computer plugboard having a plurality of plugs located in a plurality of rows and columns with the same number of pins on each plug and with certain of said pins being connected together with patchcords, comprising; a rectifier matrix; said rectifier matrix having a first pair of rectifiers connected to each pin; a plug bus line for each plug on said plugboard; one of said rectifiers for all of the pins on each plug being connected to the corresponding plug bus line; a pin bus line for each pin on said plug; the other of said rectifiers for all of the like positioned pins on each plug being connected to the corresponding pin bus line; a printer having (at least eight columns and having) key operating solenoids over certain of its keys; a double throw, double pole relay, having a pull in winding and a hold winding, associated with each pin on said plugboard; a plug stepping switch for sequentially connecting one terminal, of the pull in winding of all of the relays associated with one plug on the plugboard, to the positive terminal of a D.C. supply voltage; means connected to said plug stepping switch for operating a solenoid in the first column on said printer over the number representing the row in which the plug appears on the plugboard, when a patchcord is encountered; a second means connected to said plug stepping switch for operating a solenoid in the second column of said printer over the number representing the column in which the plug appears on the plugboard; a pin stepping switch for sequentially connecting the other terminal of each of said pull in windings, of the relays associated with the pins on one plugboard, to the negative terminal of the D.C. supply to thereby sequentially disconnect the corresponding pin from the rectifier matrix and to connect it to a source of D.C. voltage and simultaneously energize the hold winding of the corresponding relay; means connected to said pin stepping switch for operating solenoids over numbers in the third and fourth column of said printer representing the pin number on said plug when a patchcord is encountered; means for automatically stepping said pin stepping switch from one pin to the next; means for stepping the plug stepping switch one step for each complete revolution of said pin stepping switch; a second pair of rectifiers connected to the output of each of said plug bus lines; a first group of relays with one relay corresponding to each row on said computer plugboard; means for connecting each of said plug bus lines through a corresponding one of said second pair of rectifiers to the relay corresponding to the row in which the plug appears; a second group of relays with one relay corresponding to each column on said computer plugboard; means for connecting each of said plug bus lines through a corresponding one of the other of said second pair of rectifiers to the relay corresponding to the column in which the plug appears; a third pair of rectifiers connected to the output of each of said pin bus lines; a third group of relays corresponding to the tens digit appearing in the pin numbers on each plug, with no relay being provided for the zero digit; means for connecting each of said pin bus lines with a tens digit, other than zero, to the corresponding relay of said third group of relays through a corresponding one of said third pair of rectifiers; a fourth group of relays corresponding to the units digits appearing in the pin number of each plug, with no relay being provided for the zero digit; means for connecting each of said pin bus lines with a units digit other than zero to the corresponding relay of said fourth group of relays through a corresponding other one of said third pair of rectifiers; means responsive to said first group of relays for operating the solenoid over the corresponding row number in the fifth column of said printer; means responsive to said second group of relays for operating the solenoid over the corresponding column number in the sixth column of said printer; means responsive to said third group of relays for operating the solenoid over the corresponding tens digit in the seventh column of said printer; means responsive to said fourth group of relays for operating the solenoid over the corresponding units digit in the eighth column of said printer; means responsive to an output from one of said first group of relays for stopping the scanning and for operating said printer to record the code numbers representing the pins at both ends of an encountered patchcord; means for starting the scanning after the printing information has been supplied to the printer and means for disengaging all of the hold windings for the relays on one plug and for disconnecting the corresponding plug bus line from the corresponding second pair of rectifiers after the plug is completely scanned.

No references cited.